United States Patent [19]

Land

[11] 4,125,684
[45] Nov. 14, 1978

[54] ELECTRICAL CELLS AND BATTERIES

[75] Inventor: Edwin H. Land, Cambridge, Mass.

[73] Assignee: Polaroid Corporation, Cambridge, Mass.

[21] Appl. No.: 811,468

[22] Filed: Jun. 30, 1977

[51] Int. Cl.² .................... H01M 4/06; H01M 4/12
[52] U.S. Cl. .................................. 429/122; 429/162
[58] Field of Search ............... 429/162, 152, 153, 149, 429/154, 160, 178, 122

[56] References Cited

U.S. PATENT DOCUMENTS

| 3,563,805 | 2/1971 | Deierhoi, Jr. ................ 429/162 X |
| 3,734,780 | 5/1973 | Bilhorn et al. ................ 429/162 |
| 3,907,599 | 9/1975 | Fanciullo et al. ............. 429/152 |
| 4,007,472 | 2/1977 | Land ............................ 429/162 X |
| 4,028,479 | 6/1977 | Fanciullo et al. ............. 429/152 |
| 4,047,289 | 9/1977 | Wolff ........................... 429/162 X |

Primary Examiner—Anthony Skapars
Attorney, Agent, or Firm—John W. Ericson

[57] ABSTRACT

Laminar electrical cells in which one electrode comprises a thin layer of active electrode particles adhered to a central region of a conductive plastic substrate and in contact with a central region of a separator sheet of liquid permeable material. The other electrode is a slurry dispersion of active electrode particles in an aqueous solution of electrolytes in contact with the opposite side of the separator sheet. The aqueous solution permeates the separator and both electrodes.

7 Claims, 6 Drawing Figures

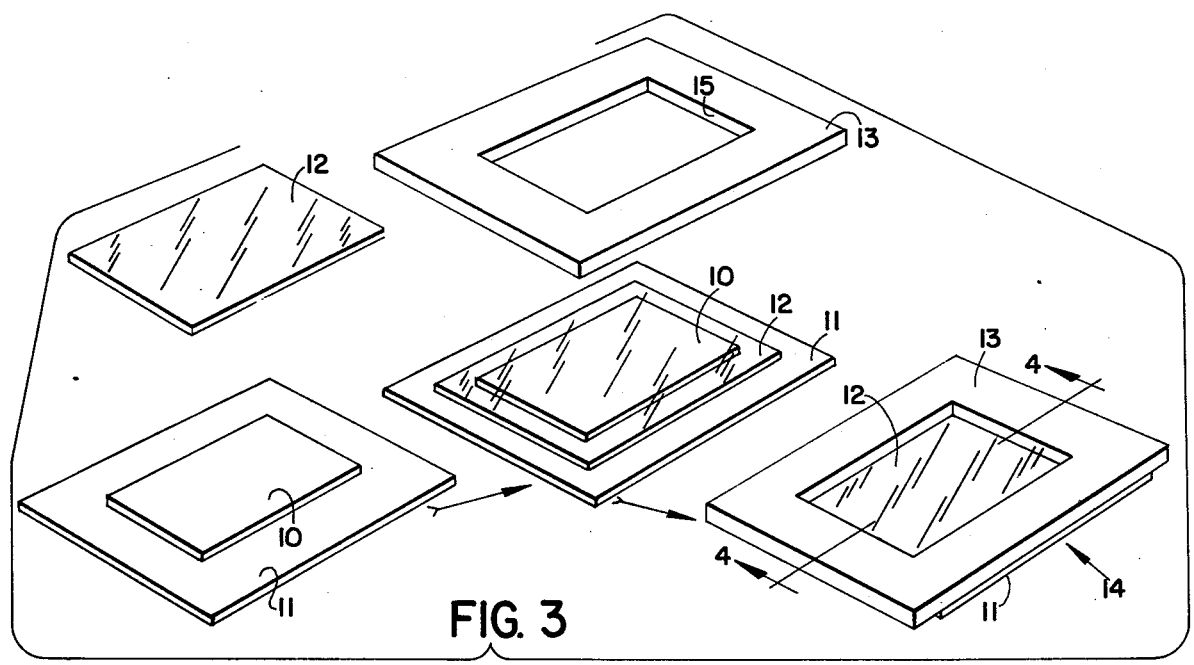
FIG. 2
FIG. 3
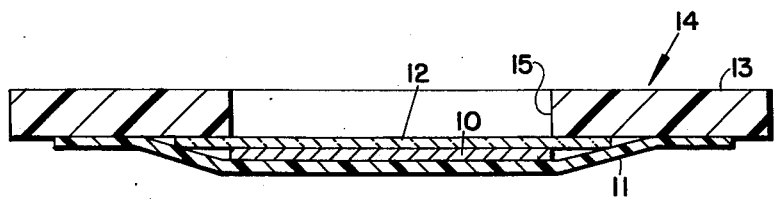
FIG. 4
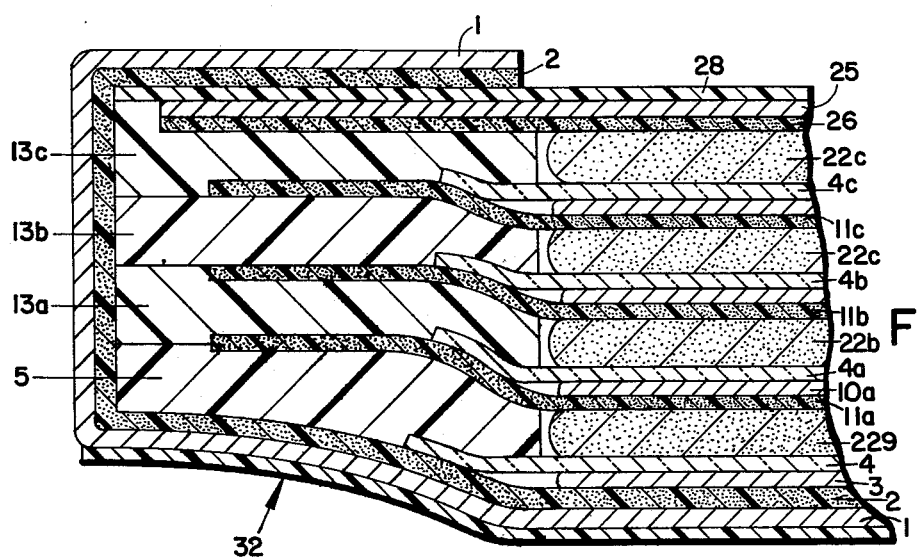
FIG. 6

ELECTRICAL CELLS AND BATTERIES

This application relates to novel electrical cells and batteries, and to methods and compositions for making the same.

Thin, flat laminar cells have been known for many years, initially as units with a high internal impedance. For example, B batteries were made of many such cells for high voltage, high load impedance applications, such as plate voltage supplies for the vacuum tubes in portable radios. Later, a low impedance, four cell battery of this general kind was developed, and is now made and sold in Polaroid SX-70 film packs for use as the power supply for such automatic self-processing cameras as the Polaroid SX-70 Land camera.

More recently, a very low impedance laminar battery with extremely high current drain capabilities has been made. Such a battery is described in U.S. application for Letters Pat. Ser. No. 761,651, filed on Jan. 24, 1977 by Edwin H. Land for Electrical Cells and Batteries and assigned to the assignee of this application. In that application, laminar cells are described which comprise dry patch anodes, each formed as a porous mass of zinc particles adhered with a binder to a conductive plastic substrate and covered and wet with a layer of gel electrolyte; regenerated cellulose separators; and wet slurry cathodes comprising particles of manganese dioxide and carbon dispersed in an aqueous solution of electrolytes.

The object of this invention is to simplify the construction and thereby facilitate the manufacture of laminar batteries, while so far as possible retaining the low impedance and high current drain capabilities attained with the construction described in the above-cited U.S. Pat. application Ser. No. 761,651.

One approach to simplifying the manufacture of laminar cells and batteries is disclosed in copending U.S. Pat. application for Letters Pat. Ser. No. 811,469, filed on June 30, 1977 by Stanley M. Bloom, Charles K. Chiklis and Gordon F. Kinsman for Electrical Cells and Batteries and Methods of Making the Same, and assigned to the assignee of this invention. As there described, a triplex laminate is made by coating a separator web with a layer of active electrode particles, then coating the electrode layer so formed with a layer of conductive plastic. Pieces of this laminate can each serve as a three part end cell subassembly or as a three part intercell subassembly. The result is a considerable simplification in manufacture in that individual separators do not need to be handled. An numerous problems encountered in the maufacture of batteries with patch printed electrodes are avoided.

Particularly when the triplex structure is made up with cellophane as the separator material, batteries of very low internal impedance can be made with these triplex structures. The cellophane, however, appears to exhibit different behavior upon wetting with aqueous electrolyte during the assembly of the battery, when it is included as part of a triplex assembly as in the above-cited application Ser. No. 811,469, rather than as part of a preformed separator and frame assembly, in which the cellophane is adhered to the frame, as described in the above-cited application Ser. No. 761,651. In both structures, the bonds to the cellophane are destroyed when the cellophane wets and swells in the aqueous electrolyte. However, upon the dissection of batteries of these different constructions, it is found that in the framed cellophone construction of application Ser. No. 761,651, the cellophane is seen to have a wavy rippled appearance, with shallow but clearly visible crests and troughs. In the triplex batteries, although the cellophane is detached from the electrode layer to which it was bonded when dry, it remains flat and thus still in intimate contact with the electrode layers on both sides.

One explanation for the fact that the framed cellophane batteries of application Ser. No. 761,651 have a very low impedance despite the rippling of the cellophane has been that the crests and troughs are accommodated by the layer of viscous gel electrolyte, typically over 5 mils, that is placed between the cellophane and the electrode on the anode side in the manufacture of batteries in accordance with application Ser. No. 761,651. Whatever the correct explanation, the fact remains that excellent batteries can be made with either of the structures just described, but that the triplex structures do offer a potential simplification of the manufacturing process in several respects.

On the other hand, the triplex structure with the cellophane separator has an inherent requirement for more effective sealing than the framed cellophane structure. Because the cellophane becomes wet, swollen and detached from the electrode layer that was coated on it, though remaining in contact with the electrode layer, and because the electrode layer goes out to the edges of the cellophane, there is a built in opportunity for interelectrode shorts that requires extra attention to detail, both as to the structures used for edge sealing, and in the process of forming the seals. A particular object of this invention is to simplify the construction of laminar batteries with cellophane separators without losing the protection against interelectrode shorts characteristic of the framed cellophane construction.

Briefly, this invention is organized about the discovery that by placing the cellophane separators in laminar cells as separate elements, rather than pre-attaching them to frames, it becomes possible to omit the gel electrolyte layer and still obtain a cell with good mechanical and electrical properties.

This result is quite unexpected, as it has previously been thought that a gel electrolyte layer adjacent a dry patch electrode layer provided an essential adhesive function in a laminar cell without external compressive stress applying members. An exposition of this theory appears, for example, in U.S. Pat. No. 3,770,504, issued on Nov. 6, 1973 to Bernard C. Bergum for High Discharge Rate Multicell Battery. Also, as noted above, with particular reference to cells with cellophane separators, it was thought that rippling of the separator upon wetting was an inherent characteristic, absent the special treatment of incorporation in a triplex structure, which required the levelling function of the gel as compensation.

A battery in accordance with the invention may be generally as described in the above-cited U.S. application Ser. No. 761,651, except that the gel electrolyte is omitted, a passivating agent such as mercuric chloride is preferably included in the cathode slurry, and a somewhat wetter cathode slurry is preferably employed. Other specific alternative embodiments will be described below.

Omission of the gel electrolyte in accordance with the invention eliminates one step of gel electrolyte application per cell, thus considerably simplifying the manufacturing process and thereby improving yields and reducing the cost of manufacture. Batteries with excellent electrical properties have been made in this manner.

The invention will best be understood in the light of the following detailed description, together with the accompanying drawings, of various illustrative embodiments thereof.

In the drawings,

FIG. 2 is a schematic cross-sectional elevational sketch, on an enlarged scale, of the subassembly prepared in the manner illustrated in FIG. 1, as seen substantially along the lines 2—2 in FIG. 1;

FIG. 3 is a schematic perspective sketch and flow diagram illustrating the preparation of a second subassembly useful in the manufacture of batteries in accordance with the invention;

FIG. 4 is a schematic cross-sectional elevational sketch, on an enlarged scale, showing a subassembly made in accordance with the process of FIG. 3 as seen essentially along the lines 4—4 in FIG. 3;

Figure 5:
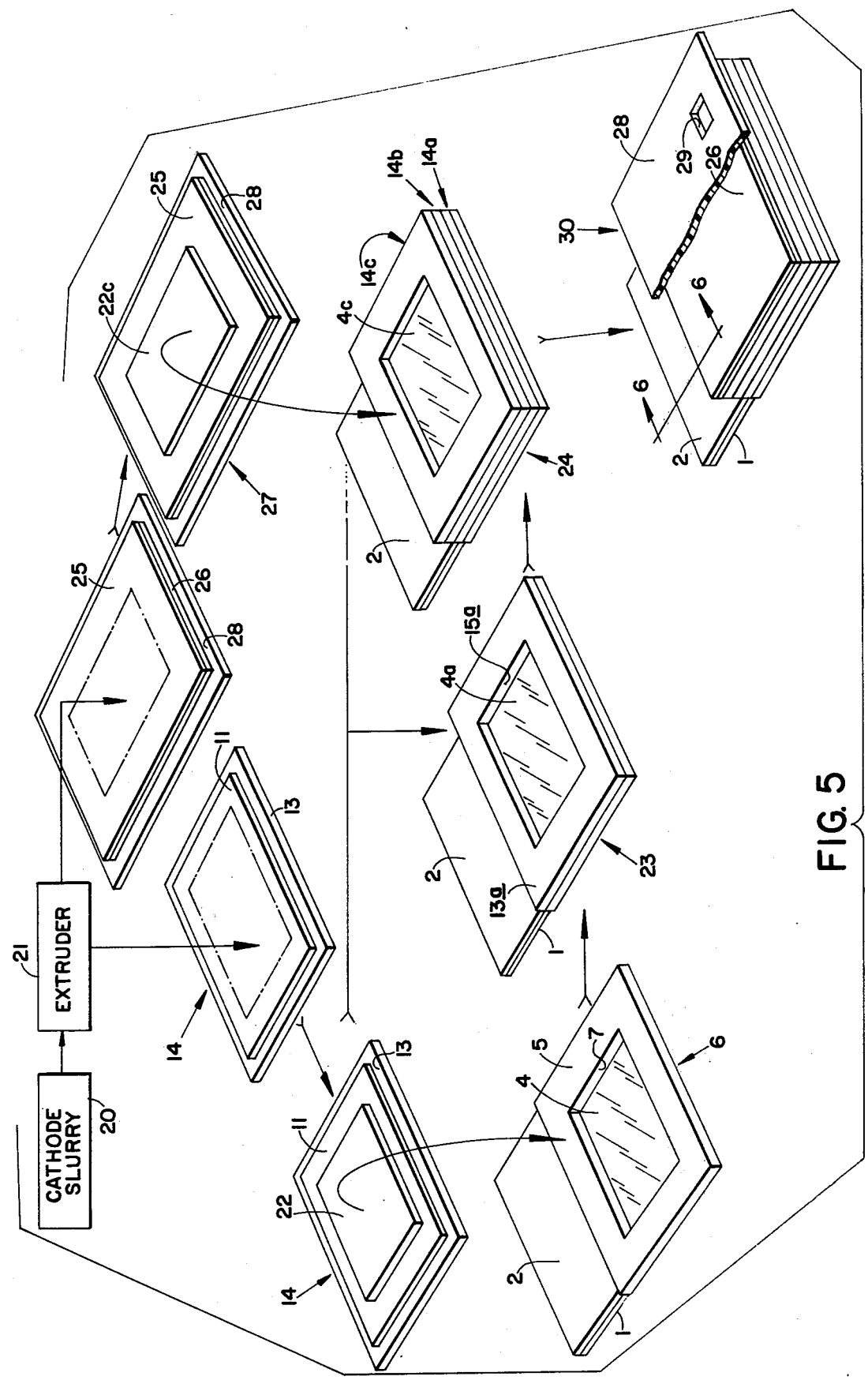

FIG. 5 is a schematic perspective sketch, block and flow diagram illustrating a process for making batteries from the subassemblies made as shown in FIGS. 1-4; and FIG. 6 is a fragmentary elevational cross-sectional sketch, with parts broken away, and on an enlarged scale, taken substantially along the lines 6—6 in FIG. 5 and showing internal details of a completed battery in accordance with the invention.

Figure 1:
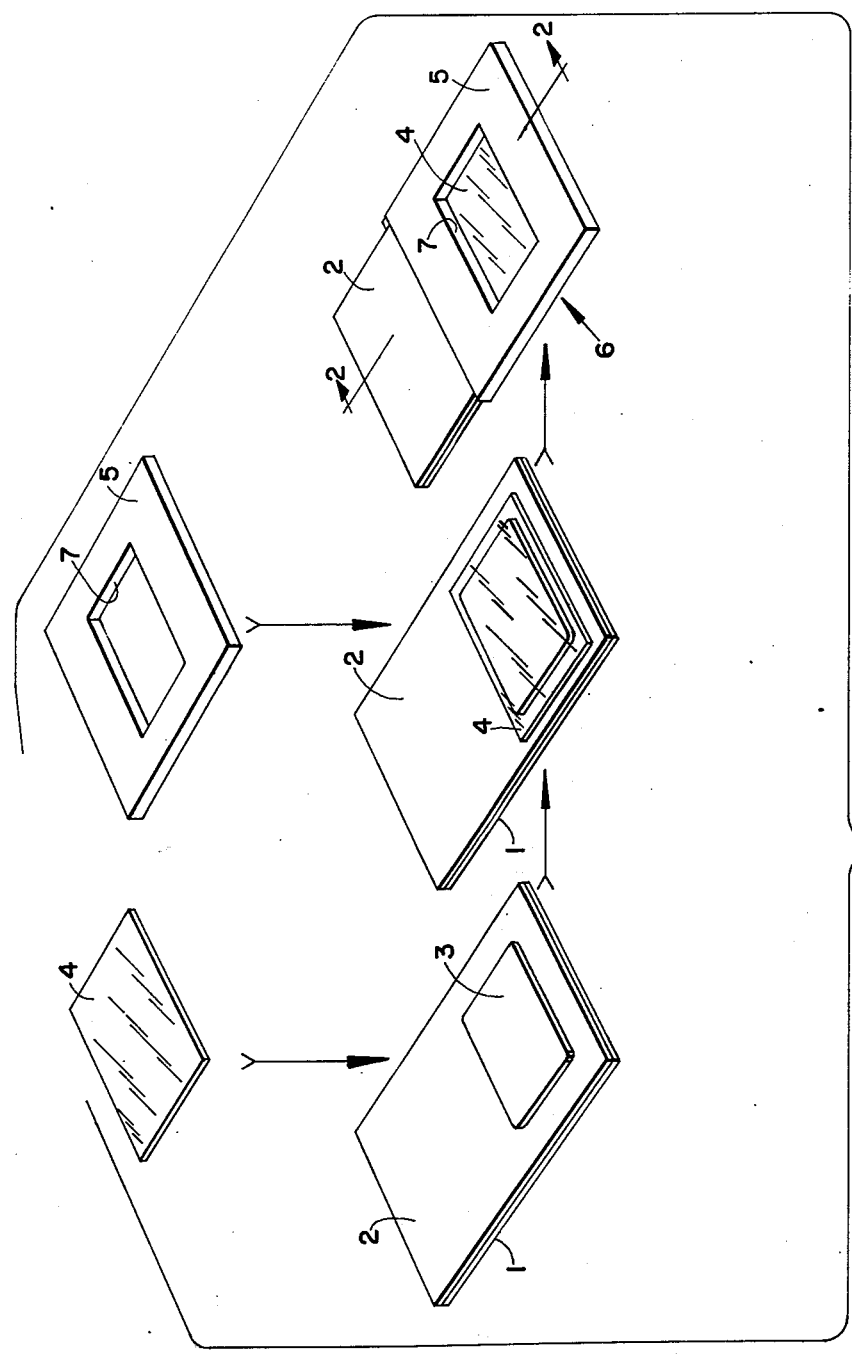
FIG. 1 is a schematic perspective sketch and flow diagram illustrating the preparation of a laminar subassembly for use in the manufacture of batteries in accordance with the invention.

Referring to FIG. 1, an anode terminal half cell subassembly may be formed as a convenient unit for use in the manufacture of batteries in accordance with the invention. This subassembly consists of an external metal terminal sheet 1 of tinned steel, aluminum, or the like, conveniently about 2 mils in thickness, to which is prelaminated a conductive plastic collector sheet 2, which similarly may be about 2 mils in thickness and may comprise a carbon filled thermoplastic material such as those conventionally employed in the art, for example, a carbon filled vinyl resin sold under the trademark Condulon by Pervel Industries, Inc.

On the collector sheet 2 is deposited a dry patch anode 3 in a conventional manner and by conventional processes, typically comprising a layer from ½ to 1 mils thick of zinc power adhered to the conductive plastic substrate with a polymeric binder to form a thin rigid porous mass. Over this anode patch 3 is placed a cellophane separator sheet 4 of regenerated cellulose, for example, 1.34 mil PUD-O cellophane as made and sold by E. I. DuPont DeNemours Co. of Wilmington, Delaware. This sheet is preferably larger than the anode patch in both major dimensions to provide an isolating region about the anode patch that will prevent the migration of anode particles into contact with cathode particles or other conductive laminae other than the current collector sheet 2.

Over the separator 4 is placed a frame 5 of insulating material, for example, of a hot melt adhesive such as Versalon 1140 polyamide resin as made and sold by General Mills Co., of Minneapolis, Minnesota, or of polyvinyl chloride or the like. The frame 5 may have major dimensions somewhat larger than those of the adjacent laminae in the finished battery.

As shown, a portion of the end metal terminal 1 and conductive plastic sheet 2 are extended beyond the frame 5 to allow for folding over the anode in the completion of the battery in a conventional manner. The frame 5 may be, for example, approximately 20 mils in thickness. When the parts are in the position shown at the right in FIG. 1, the frame 5 is sealed to the conductive plastic current collector sheet 2, as with heat and pressure, to form a finished subassembly generally designated 6 that is used in a manner to be described below in assembly of the battery.

In the sealing of the frame 5 to the current collector sheet 2, the separator 4 should be held flat over the anode 3 and bordering edges of the current collector 2, as suggested in FIG. 2, so that all air is excluded and the cellophane is kept flat in the sealing process. Temporary bonds are effected between the separator 4 and the frame 5, and between the separator 4 and the conductive plastic sheet 2, in this process. The difference between this procedure and the use of a cellophane separator pre-bonded to the frame is that, in the latter process, uneven stresses occur in the pre-bonded structure which prevent the cellophane from contacting the anode smoothly across its surface when bonding the conductive plastic sheet to the frame. When the cellophane is initially free and held flat across the anode during sealing, there is less tendency for it to wrinkle upon wetting, and it may be kept essentially flat if some care is taken to avoid the inclusion of air between the separator and the anode patch 3 during the assembly of the battery. Another way of achieving essentially the same result is to confine the sealing area between the frame and the conductive plastic sheet to regions beyond the borders of the separator 4.

FIG. 2 shows the essential elements of the subassembly 6 in cross section. As shown, a rectangular opening 7 formed in the frame 5 is essentially in registry with the electrode area defined by the anode patch 3. The separator 4 extends beyond the confines of this aperture and the anode to prevent migration of any particles of the anode material into contact with undesired portions of the cell and intercell connector elements to be described.

FIG. 3 illustrates the preparation of an intercell subassembly useful in the manufacture of batteries in accordance with the invention. Construction of this subassembly begins with the application of an anode patch 10 to a conductive plastic intercell collector 11. The intercell collector 11 may be of the same material and thickness as the end cell current collector 2 described above, and the anode patch 10 may be of the same material and construction as the anode patch 3 described above, and of the same size.

As indicated in FIG. 3, a frame 13 is next placed down over the intercell collector 11. The frame 13 may be of the same material and dimensions as the frame 5 described above, and preferably is somewhat larger than the intercell connector 11 in both major dimensions to protect against undesired shorting between the intercell connector 11, the adjacent intercell connector in the next cell, and the anode and cathode collectors. The frame 13 is sealed to the intercell connector 11 over the separator 12, in the manner described above in connection with the sealing of the separator 5 and with the same precautions to avoid any wrinkling of the cellophane during sealing. The result is an intercell subassembly 14 of which as many may be employed as needed to make up a battery of the desired voltage. Three of the subassemblies 14 may be used to manufacture a four cell battery in a manner to be described.

FIG. 4 shows the subassembly 14 in internal detail. It will be seen that there are the same relations between the aperture 15 in the frame 14, the anode patch 10, and the separator 12, as described above in connection with the anode half cell terminal assembly.

FIG. 5 shows a process for assembling a battery from the subassemblies described above. It will be apparent that the battery can be assembled anode first or cathode first, a choice which can be made in dependence on considerations not relevant to the present invention.

FIG. 5 shows the anode-first method, in which the first step is the extrusion of a cathode slurry layer 22 on one of the subassemblies 14. As noted above, three of these subassemblies 14 are required for a four cell battery. As these are shown in position, they will be identified by the suffixes a, b and c, respectively, applied to the reference characters of their respective components.

A supply of cathode slurry in a suitable container schematically indicated at 20 is provided. This cathode slurry may be of any desired and suitable composition, but is preferably of the kind described in the above cited U.S. application Ser. No. 761,657, but with added electrolyte and a passivating agent such as mercury chloride.

A suitable and presently preferred composition is as follows, in percent by weight, based on the total weight of slurry:

| | |
|---|---|
| $MnO_2$ | 47 |
| Shawinigan Black | 6 |
| $H_2O$ | 30 |
| $ZnCl_2$ | 5 |
| $HgCl_2$ | 2 |
| $NH_4CL$ | 10 |
| TOTAL | 100 |

Shawinigan Black is carbon black as made and sold by Shawinigan Products Corp. of N.Y., N.Y., and is used here and in the compositions described below in the 100 percent compressed form.

Composition from the supply 20 is pumped in any conventional manner to an extruder 21. Since for a four cell battery, three of the subassemblies 14 are required, three extruders may be provided if desired. As suggested in FIG. 5, the extruder 21 applies a layer 22 of cathode slurry to the conductive plastic intercell connector 11 within a region indicated by the dotted lines, and on the opposite side from the separator 12, over a region substantially coextensive with the region occupied by the anode slurry 10 as indicated in FIGS. 3 and 4.

As suggested in FIG. 5, the first of these subassemblies 14, provided with a cathode slurry layer 22a (compare FIG. 6), is inverted relative to the position shown in FIG. 5 and placed down over the subassembly 6 with the cathode slurry layer in registry with the opening 7 in the frame 5. The result is a complete end cell subassembly generally designated 23 in FIG. 5.

The operation is continued by placing another subassembly 14b with cathode slurry 22b inverted from the position shown in FIG. 5, over the subassembly 23 with the cathode extending into the opening 7a in the frame 13a in the same manner as just described. The portion of the process is completed with the addition of the third subassembly 14c, resulting in the formation of the subassembly generally designated 24 in FIG. 5.

Next, a cathode terminal subassembly is prepared by extruding a cathode layer 22c over the surface of a cathode end terminal assembly comprising a conductive plastic current collector 25 prelaminated to a conductive metal terminal sheet 26. The material and thicknesses of the sheets 25 and 26 may correspond to those of the anode end terminal elements 2 and 1 respectively. The cathode terminal subassembly includes a sheet 28 of suitable insulating material, such as five mil sheet of kraft paper or the like, which is pre-adhered to the metal terminal sheet 26. As indicated in FIG. 5, this insulating sheet 28 may be provided with an aperture 29 for purposes of admitting an electrical contact to the metal cathode terminal sheet 26 as is conventional.

The completed end cathode half cell subassembly is generally designated 27. This subassembly 27 is inverted from the position shown in FIG. 5 and placed over the subassembly 24 with the cathode layer 22c in registry with the exposed portion of the separator 4c.

The subassembly just described comprises a battery generally designated 30 in FIG. 5 that is completed except for sealing and final packaging. FIG. 6 shows the internal construction of the battery 30 following the sealing procedure, and following the folding of the exposed anodeend terminal sheet 1 and conductive plastic collector 2 around to form a terminal accessible on the same side as the cathode terminal sheet 25. As indicated in FIG. 6, a glassine overwrap layer 32 is preferably included prior to final sealing in the manner and for the purposes described in U.S. Pat. No. 4,019,251, issued on Apr. 26, 1977 to Thomas P. McCole for Flat Battery and Method of Manufacture and assigned to the assignee of this application.

It may be desired to assemble the battery 30 beginning with the cathode terminal subassembly including the insulating sheet 28, metal terminal 26 and cathode current collector 25. Such a procedure is especially desirable if the insulating sheet 28 forms a part of an elongated web used to convey a series of components through the manufacturing process for the manufacture of batteries. For this purpose, the process of assembly may begin by extruding a cathode slurry layer 22c on the conductive plastic current collector 25 as described above. The process is continued by adding a subassembly 14 with its cellophane separator 10 in contact with the cathode layer 22c. This will be followed by the extrusion of a layer of cathode slurry onto the conductive plastic side 11 of the subassembly 14 in place. Assembly could be continued in this manner until the subassembly 6, inverted from its position shown in FIG. 5, was placed over the last of the cathode slurries. Alternatively, the first step could be the extrusion of a cathode layer 22 on the conductive plastic surface 11 of the subassemblies 14. This would then be inverted and placed with the cathode in the dotted line region of the conductive plastic layer 25, and so on. The result would be the same assembly 30 in FIG. 5, which for the sake of preserving the reader's orientation would be considered to be inverted from the position shown.

It will be apparent that during the assembly of the battery by any of the methods described above, wetting and consequent swelling of the cellophane separators, and of the underlying anode layers, will begin as soon as a cathode slurry layer contacts the cellophane. The battery will thus be activated by diffusion of the aqueous solution of electrolytes, at a viscosity of about that of water, or 1 centipoise, from the cathode slurry through the separator into the porous zinc anode layer.

The mercuric ions in the cathode slurry will eventually all go into the anode as an amalgam with the zinc.

The following examples are illustrative of the practice of the invention:

EXAMPLE I

Four four-cell batteries, referred to below as Examples IA, IB, IC and ID, were made by the first process described above and using the specific components next described.

The anode end terminal subassemblies 6 were 3.114 inches by 3.863 inches and comprised 2 mil condulon conductive plastic laminated to 2 mil tinned steel with an anode patch formed as described below, a separator of 1.34 mil PUD-O cellophane 2.430 by 3.112 inches, and a frame 3.430 by 2.760 inches of 5 mil polyvinyl chloride with a central aperture 2.125 by 2.790 inches heat sealed to the conductive plastic.

Three subassemblies 14 were incorporated in each battery, each comprising a frame as described above, an intercell connector 2.75 by 3.42 inches of 2 mil Condulon conductive plastic, an anode patch on the conductive plastic of the kind described below and a cellophane separator as described above.

One cathode end terminal subassembly was used for each battery, comprising a 2 mil sheet of tinned steel 3.114 by 2.413 inches prelaminated to a 2 mil sheet of Condulon conductive plastic of the same size.

The anode patches were made from the following composition, in which composition is expressed in parts by weight.

| | |
|---|---|
| Zinc powder | 1,000 |
| $H_2O$ | 149.2 |
| Benton LT Dispersant | .61 |
| Tetrasodium pyrophosphate | .25 |
| Shawinigan Black | 5 |
| Polytex 6510 Latex | 39.05 |
| Cab-O-Sil M5 | 4.5 |

In the above composition, Polytex 6510 in an acrylic emulsion resin made and sold by Celanese Corp. of Newark, New Jersey. Cab-O-Sil M5 is pyrogenic colloidal silica as made and sold by Cabot Corp. of Boston, Mass. Benton LT is an organic derivative of hydrous magnesium aluminum cilicate, as made and sold by National Lead Co., Inc. of N.Y., N.Y.

For each patch, 0.5 grams of this composition was spread on the conductive plastic sheets with a silk screen, using the edge of a rubber blade as a squeegee, and then heated to dryness to form a dry patch of an area about 2½ by 1⅞ inches.

The cathode slurry patches were applied to the conductive plastic sheets through a mask using the edge of a glass plate as a spatula, over a central area of about 2¼ inches by 1⅞ inches. The weight of slurry per cathode was 3.0 grams. The cathode composition was as follows, in parts by weight:

| | |
|---|---|
| $MnO_2$ | 400 |
| Shawinigan Black | 50 |
| $HgCl_2$ | 16 |
| $ZnCl_2$ | 36.8 |
| $NH_4Cl$ | 81.1 |
| $H_2O$ | 236.1 |

The batteries made as described above were measured for open circuit voltage (OCV) and closed circuit voltage (CCV) with a 3.3 ohm load for 0.1 seconds on the day of manufacture, after 15 days and after 63 days with the following results:

| | First Day | | 15 Days | | 63 Days | |
|---|---|---|---|---|---|---|
| Example | OCV | CCV | OCV | CCV | OCV | CCV |
| IA | 6.69 | 5.86 | 6.69 | 5.81 | 6.68 | 5.82 |
| IB | 6.68 | 5.69 | 6.66 | 5.60 | 6.63 | 5.37 |
| IC | 6.69 | 5.91 | 6.69 | 5.84 | 6.67 | 5.81 |
| ID | 6.79 | 5.90 | 6.70 | 5.86 | 6.69 | 5.84 |

EXAMPLE II

Five four-cell batteries were made exactly as described in Example I above, except that for each cathode 3.0 grams of a slurry of the following composition, in parts by weight, was employed:

| | |
|---|---|
| $MnO_2$ | 200 |
| Shawinigan Black | 25 |
| $HgCl_2$ | 8.3 |
| $ZnCl_2$ | 20.1 |
| $NH_4Cl$ | 44.2 |
| $H_2O$ | 128.7 |

This composition is essentially that given above as preferred. These batteries, identified as Examples IIA through IIE below, were measured on the day of manufacture, after 10 days and after 48 days, with the following results:

| | First Day | | 10 Days | | 48 Days | |
|---|---|---|---|---|---|---|
| Example | OCV | CCV | OCV | CCV | OCV | CCV |
| IIA | 6.64 | 6.17 | 6.64 | 6.03 | 6.63 | 6.02 |
| IIB | 6.64 | 6.17 | 6.64 | 6.06 | 6.63 | 6.02 |
| IIC | 6.64 | 6.16 | 6.63 | 6.05 | 6.63 | 6.02 |
| IID | 6.65 | 6.18 | 6.64 | 6.05 | 6.63 | 6.06 |
| IIE | 6.64 | 6.14 | 6.63 | 6.04 | 6.62 | 6.04 |

EXAMPLE III

Five four-cell batteries were made exactly as described in Example I above, except that for each cathode 3.0 grams of a slurry of the following composition, in parts by weight, was employed:

| | |
|---|---|
| $MnO_2$ | 200 |
| Shawinigan Black | 25 |
| $HgCl_2$ | 8.68 |
| $ZnCl_2$ | 21.7 |
| $NH_4Cl$ | 47.9 |
| $H_2O$ | 139.4 |

These batteries, identified as Examples IIIA through IIIE below, were measured on the day of manufacture, after 10 days and, with two exceptions, after 48 days, with the following results:

| | First Day | | 10 Days | | 48 Days | |
|---|---|---|---|---|---|---|
| Example | OCV | CCV | OCV | CCV | OCV | CCV |
| IIIA | 6.64 | 6.16 | 6.63 | 6.02 | 6.62 | 6.00 |
| IIIB | 6.62 | 6.16 | 6.61 | 6.01 | 6.60 | 5.94 |
| IIIC | 6.64 | 6.17 | 6.63 | 6.01 | — | — |
| IIID | 6.64 | 6.17 | 6.63 | 6.01 | — | — |
| IIIE | 6.64 | 6.18 | 6.63 | 6.03 | 6.62 | 6.04 |

(The batteries of Examples IIIC and IIID were destroyed before the 48 days test).

The performance of the batteries of Examples I, II and III may be expressed in terms of internal impedance at the 3.3 ohm load condition as $Ri = 3.3 (OCV/CCV - 1)$ where $Ri$ is the internal impedance of the battery in ohms and OCV and CCV are the open and closed circuit voltages given above. The average value for the batteries of Example II after 48 days is 0.32 ohms, or 0.080 ohms per cell. The corresponding value for Example III is 0.342 ohms, or 0.085 ohms per cell. Average values for Example I above are 0.519 ohms after 15 days and 0.558 ohms after 63 days. Lower values have been attained with batteries of the kind described in the above cited copending application Ser. No. 761,651; i.e., on the order of 0.05 ohms per cell. However, the internal impedance of all of the batteries of Examples I-III is low by most standards. And surprisingly, because there is no specific binding mechanism between the wet zinc anode layers and the contiguous wet cellophane separators in the finished battery, batteries in accordance with the invention function almost as well without external compressive stress as with it. To illustrate this point, measurements of OCV and CCV were made on the batteries of Example II above for 0.1 seconds with a 3.3 ohm load, but under specific conditions of applied pressure, and 49 days after manufacture. (Measurements given above were each made by placing the battery on the tester with a relatively light but undetermined hand pressure on the active area of the battery.) In order to make the following measurements, the battery was placed on the tester and held in place with a plastic sheet 2.13 inches by 2.80 inches, placed over the active electrode region of the battery with weights added to produce total weights, including the weight of the plastic sheet, of one pound and 10 pounds, respectively. The following results were obtained:

|     | One Pound |      |         | 10 Pounds |      |         |
|-----|-----------|------|---------|-----------|------|---------|
| Ex. | OCV       | CCV  | Ri Ohms | OCV       | CCV  | Ri Ohms |
| IIA | 6.62      | 5.96 | .365    | 6.62      | 5.94 | .378    |
| IIB | 6.63      | 5.94 | .383    | 6.63      | 6.02 | .334    |
| IIC | 6.63      | 5.93 | .334    | 6.62      | 6.01 | .335    |
| IID | 6.63      | 6.02 | 0.334   | 6.62      | 6.02 | .329    |
| IIE | 6.62      | 6.00 | .341    | 6.62      | 6.01 | .335    |
|     |           | Ri Ave. | .363 |           | Ri Ave. | .342 |

The above tests indicate a decrease in internal impedance of less than 6 percent with a tenfold increase in pressure.

It is noted that the weights used in the above tests, distributed with the aid of the plastic sheet, represent applied pressures of 0.17 pounds per square inch and 1.7 pounds per square inch, respectively. In order to determine the relationship between these measurements and the hand test method usually employed, the same batteries were tested in the same way 3 days later, and then hand tested, with the following results:

|         | 1 lb. |      |      | 10 lb. |      |      | Hand Test |      |      |
|---------|-------|------|------|--------|------|------|-----------|------|------|
| Example | OCV   | CCV  | Ri   | OCV    | CCV  | Ri   | OCV       | CCV  | Ri   |
| IIA     | 6.61  | 5.73 | .507 | 6.61   | 5.86 | .422 | 6.54      | 5.84 | .396 |
| IIB     | 6.63  | 6.01 | .340 | 6.62   | 5.94 | .378 | 6.61      | 5.94 | .372 |
| IIC     | 6.62  | 5.95 | .372 | 6.62   | 5.93 | .384 | 6.61      | 5.94 | .372 |
| IID     | 6.62  | 5.97 | .359 | 6.62   | 5.93 | .384 | 6.62      | 5.93 | .384 |
| IIE     | 6.62  | 5.95 | .372 | 6.61   | 5.94 | .372 | 6.61      | 5.91 | .391 |
| Average | 6.62  | 5.92 | .390 | 6.62   | 5.92 | .388 | 6.60      | 5.91 | .383 |

The above results show larger discrepancies between the batteries in the same tests than between the mean values for the different tests. There is the suggestion in the results that the batteries are beginning to show the results of repeated tests. This effect may be to some extent accounted for by averaging the mean internal resistances for the 48 day hand test, given in the first table under the heading Example II above, and the last hand test, given in the table next above, for the first and second one pound tests, and for the first and second ten pound tests. The results are as follows:

| TEST      | Ri Ave, ohm |
|-----------|-------------|
| HAND      | .36         |
| 10 POUND  | .37         |
| ONE POUND | .38         |

These results suggest about a 5 percent lower internal resistance as measured by the hand method than by the 1-pound method. However, the effects of pressure are obviously small. By way of illustration of what variations in internal impedance with pressure have previously been accepted as minimal in laminar batteries of the general kind here considered, the fully adhered four cell battery described in U.S. Pat. No. 3,770,504 is cited as having OCV/CCV values of 6.37/5.01 at "no pressure," 6.30/5.06 at "1 lb. pressure" and 6.25/5.20 at "10 lb. pressure" when tested for 1.1 seconds at 3.3 ohms. The corresponding internal impedances are 0.90 ohms, 0.82 ohms, and 0.67 ohms, respectively, or a decrease of 25.6 percent over the range. Since the test current intervals are longer and the pressures are not necessarily the same, a direct quantitative comparison is not made, but the quanitative difference appears significant.

EXAMPLE IV

A four-cell battery was made in the same manner described in Example I above, except that 3.5 grams of a cathode slurry of the following composition, in percent by weight, based on the weight of slurry, was used for each cathode:

| $MnO_2$          | 49.5  |
| Shawinigan Black | 6.2   |
| $ZnCl_2$         | 4.4   |
| $NH_4Cl$         | 9.7   |
| $HgCl_2$         | 2.0   |
| $H_2O$           | 28.2  |
|                  | 100.0 |

This battery had an OCV of 6.73 volts and a CCV of 5.85 volts with 3.3 ohm load for 0.1 seconds, giving an internal impedance of 0.496 ohms. The battery was tested in the manner described in the above cited U.S. application Ser. No. 761,651. For this test, a Polaroid SX-70 Land camera was fitted with an electronic flash unit having a light output of about 37 watt seconds, and an input emergy requirement of about 80 watt seconds. The flash unit was connected to be charged from the battery under test. The battery was also used to energize the camera to perform the functions of exposure control and film advance in the normal manner, except that, experience having shown that advancing film units through the processing rolls made no detectable difference in the test, no film units were employed. In the test, the initially discharged flash unit is charged unit its ready light glows. The shutter button of the camera is then operated, causing the camera to go through its cycle, during which time the flash unit is discharged. The battery is then electrically disconnected, and allowed thirty seconds to recover. This cycle is estimated to require a total energy of about 90 to 100 watt seconds, and is carried out ten times to simulate a ten-shot photographic sequence. Each time the flash unit is charged during the test, the time between the start of charge and the time when the ready light glows and charging is stopped is noted. The results of this test, for the battery of Example IV, were as follows:

| Cycle | Recharge Time, Seconds |
|-------|------------------------|
| 1     | 4.4                    |
| 2     | 5.0                    |
| 3     | 5.2                    |
| 4     | 5.8                    |
| 5     | 5.8                    |
| 6     | 6.0                    |
| 7     | 6.2                    |
| 8     | 6.6                    |
| 9     | 6.8                    |
| 10    | 7.2                    |

The cathode slurry compositions of Examples I, II and III above differ primarily in the amount of aqueous electrolyte employed, as the concentration of the salts are essentially the same in each of the examples and the weight ratio of $MnO_2$ to carbon is the same. The amount of electrolyte in these examples, in weight percent based on the total weight of slurry, is as follows:

| EXAMPLE       | I    | II   | III  |
|---------------|------|------|------|
| Water + Salts | 45.1 | 47.2 | 49.1 |
| Carbon        | 6.1  | 5.9  | 5.7  |
| $MnO_2$       | 48.8 | 46.9 | 45.2 |

By way of contrast, the preferred cathode slurry described in the above cited copending application Ser. No. 761,651 contains about 41.7 percent by weight of liquid electrolyte, although larger amounts have been employed. The difference is presumed to be in the requirement to wet the anode, and to supply some additional liquid to the separator, in the construction of this invention, although the exact amounts required for these purposes are not known. It is noted in this regard, however, that the size of the cathode slurry layer and the thickness of the separator would obviously affect the amount of excess aqueous electrolyte needed in the cathode slurry. In the construction described a 3.5 or 4 gram cathode could be made with a somewhat smaller proportion of electrolyte than the proportions given, and a 1½ to 2 gram cathode would have to be made wetter, with the same separator and anode dimensions given.

While the invention has been described with respect to the specific details of particular embodiments, many changes and variations will become apparent to those skilled in the art from the above description. Such can obviously be made without departing from the scope of the invention.

Having thus described the invention, what is claimed is:

1. An electrode terminal subassembly, comprising a thin, flat metal terminal sheet, a thin, flat current collector sheet of conductive plastic conductively adhered to said terminal sheet, a thin, flat dry patch electrode adhered to a predetermined region of the surface of said current collector within the peripheries of said current collector, a thin, flat separator over said electrode and extending beyond the boundaries of said electrode over adjacent regions of said current collector within said peripheries, and an insulating frame over said current collector and said separator, said frame being formed with a central aperture in registry with said electrode and smaller than said separator, and said frame being adhered to regions of said current collector beyond the boundaries of said separator.

2. An anode terminal subassembly, comprising a thin, flat metal terminal sheet, a thin, flat current collector sheet of conductive plastic conductively adhered to said terminal sheet, a thin, flat dry patch anode adhered to a predetermined region of the surface of said current collector within the peripheries of said current collector, a thin, flat cellophane separator over said anode and extending beyond the boundaries of said anode over adjacent regions of said current collector within said peripheries, and an insulating frame over said current collector and said separator, said frame being formed with a central aperture in registry with said anode and smaller than said separator, and said frame being sealed to regions of said current collector beyond the boundaries of said separator.

3. An anode terminal subassembly, comprising a thin, flat metal terminal sheet, a thin, flat current collector sheet of conductive plastic adhered to said terminal sheet, a thin, flat zinc anode covering a predetermined region of the surface of said current collector within the peripheries of said current collector, a thin, flat cellophane separator over said anode and extending beyond the boundaries of said anode over adjacent regions of said current collector within said peripheries, and an insulating frame of thermoplastic material over said current collector and said separator, said frame being formed with a central aperture in registry with said anode and smaller than said separator, and said frame being sealed to regions of said current collector beyond the boundaries of said separator.

4. A subassembly for use in the manufacture of laminar batteries and comprising, in combination, a conductive plastic intercell connector, a dry patch anode layer adhered to a central region of a surface of said intercell connector within its boundaries, a thin, flat cellophane separator covering said anode layer and extending beyond the boundaries of said anode layer over portions of said intercell connector within the boundaries of said intercell connector, and a thin, flat frame of insulating material overlapping said separator and having a central opening in registry with said anode layer, said frame having border portions adhered to regions of said surface of said intercell connector beyond the boundaries of said separator.

5. The subassembly of claim 4, further comprising a cathode slurry patch adhering to a surface of said intercell connector opposite said surface to which said anode layer is adhered.

6. A subassembly for use in the manufacture of laminar batteries and comprising, in combination, a conductive plastic intercell connector, a dry patch anode layer of zinc particles adhered with an adhesive binder to a central region of a surface of said intercell connector within its boundaries, a cellophane separator covering said anode layer and extending beyond the boundaries of said anode layer over portions of said intercell connector within the boundaries of said intercell connector, and a thin, flat frame of insulating material adhered to regions of said surface of said intercell connector beyond the boundaries of said separator.

7. The subassembly of claim 6, further comprising a cathode slurry patch comprising a dispersion of manganese dioxide and carbon particles in an aqueous solution of electrolytes adhering to a surface of said intercell connector opposite said surface to which said anode layer is adhered.

* * * * *